United States Patent [19]

Holroyd et al.

[11] Patent Number: 4,943,492

[45] Date of Patent: Jul. 24, 1990

[54] WELDING ALUMINIUM ALLOYS

[75] Inventors: Nigel J. H. Holroyd, Brackley; Geoffrey M. Scamans, Banbury, both of England

[73] Assignee: Alcan International Limited, Montreal, Canada

[21] Appl. No.: 160,719

[22] Filed: Feb. 26, 1988

[51] Int. Cl.$^5$ .......................... B32B 15/01; B32B 15/20
[52] U.S. Cl. ................................ 428/654; 228/263.17; 427/423
[58] Field of Search ................. 428/654; 420/528, 540, 420/541, 542; 228/155, 263.17; 427/423

[56] References Cited

U.S. PATENT DOCUMENTS

| | | | |
|---|---|---|---|
| 2,797,174 | 6/1957 | Mozley et al. | 428/654 |
| 4,196,262 | 4/1980 | Pryor et al. | 428/654 |
| 4,558,695 | 12/1985 | Kumazawa et al. | 228/155 |

FOREIGN PATENT DOCUMENTS

| | | | |
|---|---|---|---|
| 1592795 | 6/1970 | France | 420/541 |
| 96243 | 6/1984 | Japan | 420/541 |

OTHER PUBLICATIONS

Holroyd et al., "Protection of Al-Zn-Mg Welds Against Exfoliation and Stress Corrosion Cracking Using Aluminum Based Metal Spray Coatings", presented Dec. 2-6, 1985, published by American Society for Metals, Metals/Materials Technology Series.

Holroyd et al., "Prevention of Weld Toe Cracking and Exfoliation Corrosion in Al-Zn-Mg Welds", Third Intl. Conf. Environmental Degradation of Engineering Materials, Penn State Univ., Apr. 13-15, 1987.

J. T. Reding et al., "The Influence of Alloying Elements on Aluminum Anodes in Sea Water," Materials Protection, 5, 15-18 (1966).

*Primary Examiner*—Robert McDowell
*Attorney, Agent, or Firm*—Cooper & Dunham

[57] ABSTRACT

Welded structures composed of aluminium alloy components are protected from white zone and exfoliation corrosion by means of a surface layer applied over the weld bead and consisting of an aluminium alloy containing 0.02 to 0.4% by weight of indium. Other elements which may be present include zinc 0.1 to 1.5%; manganese, 0.02 to 0.5%; tin, 0.12 to 0.50%; gallium, 0 to 0.2%; and magnesium, 0.01 to 6%. The surface coating may be applied by arc or flame spraying or by welding.

23 Claims, No Drawings

WELDING ALUMINIUM ALLOYS

This invention concerns weldable aluminium alloys, particularly high strength alloys containing zinc and magnesium, for example those of the 7000 series of the Register of the Aluminum Association Inc. These alloys often contain Cu in amount up to 0.1% or 0.2% despite its adverse effect on weldability, and may contain minor additions of Mn, Cr, Zr, and Ti. The alloys can be naturally or artificially age-hardened. A wide range of mechanical properties can be obtained, depending mainly on composition and heat-treatment. These alloys have been reviewed by K. G. Kent, Metallurgical Reviews, No. 147, 135 to 146, 1970.

The operation of welding involves positioning two components to be welded with surfaces (faying surfaces) in contact, and applying molten filler metal to form a weld bead along the or each line bounding the faying surfaces. In order to maximize the strength of the welded structure, it is generally accepted that the weld bead should have a composition and properties as close as possible to those of the welded components. Conventional welding wire is often an Al alloy containing 5.25% Mg; as a result of diffusion during the welding operation, the weld bead often contains Zn and Mg in proportions approximating to those in the welded components. Heat treatment of the components prior to welding, and of the welded structure, are chosen to generate the desired combination of properties.

Microscopic examination of the structure of a weld reveals a boundary between a welded component and the weld bead and a narrow zone adjacent this boundary where parent metal of the welded component has been partially melted during the welding operation. This zone is characterized by a recrystallised, almost spheroidal grain structure, in which the grain interior contains significantly fewer precipitates than the adjacent unmelted parent metal. The primary phases here lie principally at the grain boundaries. On the basis of its appearance in an etched section, this zone has been called the "white zone" which phrase is used hereinafter. (H. Schmiedel and W. Gruhl, Metall., 38, 32 to 37, 1984).

The strength of welded structures of these high strength Al alloys can be reduced by stress-corrosion cracking initiated in this white zone. This phenomenon is well known, and has been widely discussed in the scientific literature (see e.g. H. Schmiedel et al. above). The phenomenon is properly called stress-corrosion cracking, for an applied stress and a corrosive environment are both required for cracking to propagate. It is known that Al alloys are more prone to cracking when the (Zn+Mg) concentration exceeds about 6%. It has been reported that the white zone may contain enhanced Zn concentrations, sufficient to take the (Zn+Mg) level over this limit. M. S. Rahman et al (Z. Metallkde, 73, 589 to 593, 1982) have proposed using a welding wire containing additions of Ag to lower excess levels of Zn and Mg in the white zone.

Another kind of corrosive attack is known as exfoliation corrosion. This also has been widely discussed in the scientific literature (see e.g. K. G. Kent, above). Exfoliation corrosion can occur in naturally aged parent metal and in the heat affected zone (within a few mm of the white zone) of naturally ageing welds when the corrosive environment is severe. The attack is mainly intercrystalline but may be transcrystalline in the heat affected zone adjacent welds. Although external stress is not necessary, this corrosion may be regarded as a self-stressing form of attack, since multiple layers of corrosion products may build up.

One approach to these problems has been to coat the weld bead and the surrounding regions of the welded components with a surface layer to physically prevent access of corrosive media to the weld bead. This approach is satisfactory only in so far as the integrity of the surface is maintained. If imperfections develop in the surface layer, then electrochemical conditions can be set up in the resulting cracks which cause the weld to fail more rapidly than would be the case in the absence of the surface layer.

PCT Application WO 83/02415 describes a method of protecting welded components from various types of stress corrosion cracking by applying to the individual components before welding a coating of an Al alloy having a potential more electronegative than the metal of the components. The specific example uses an Al alloy containing 0.8% of In. In our hands, precoating the components in this way severely reduces the strength of the welded joints.

In a paper number 8517-046 published by the American Society for Metals in 1986, N. J. H. Holroyd et al. discuss an approach to this problem in which the surface layer is arranged to be more electronegative than the weld bead and the welded components. The paper concludes that: (1) local environmental conditions associated with weld-toe cracking and white-zone cracking in Al-Zn-Mg welds in service are acidic and similar to those of parent plate stress corrosion cracking; (2) an electrochemical domain, i.e. a safe potential zone, exists within which Al-Zn-Mg welds are immune to all forms of corrosion including weld-toe cracking, white-zone cracking and exfoliation; (3) aluminium based sprayed coatings will maintain Al—Zn—Mg welds within the safe potential zone and prevent service problems. The paper describes the use of surface coatings containing In and/or Ga and/or Sn in Al/Zn alloys, but no details of proportions are given and the results quoted were not uniformly successful particularly under acid conditions.

This invention results from further work which has identified a number of previously undisclosed features that are required for satisfactory protection of welds by means of surface coatings. In one aspect, the invention provides a welded structure in which two Al alloy components are joined together by means of a weld bead which is at least partly covered by a surface layer of an Al alloy, characterized in that the surface layer contains In from 0.02 to 0.4% by weight, and optionally Sn from 0.05 to 1.1% by weight, the In and Sn being present substantially in solid solution.

The welded components are generally medium strength Al alloys, for example, weldable 7000 or 5000 Series alloys. The exact composition of the weld bead is not critical; it may be formed in conventional manner using welding wire of an Al alloy containing 5.25% Mg.

The thickness of the surface layer may typically be from 0.1 to 1.0 mm or more, preferably from 0.20 to 0.375 mm when applied by spray coating or up to 5 mm when applied by velding. The coating should extend over the surface of the welded components for a distance of up to 100 mm, typically about 30 mm, on either side of the weld bead.

The surface layer may preferably have the composition in weight %:

| | |
|---|---|
| Zn | 0–7.0 |
| Mn | 0–5.0 |
| In | 0.04–0.4 |
| Sn | 0.05–1.1 |
| Ga | 0–0.2 |
| Mg | 0–6.0 | balance Al of at least commercial purity.

The surface layer is preferably a sprayed coating, for example an arc-sprayed or flame-sprayed coating. It is known that volatilization losses occur during arc-spraying, depending on the volatility of the element involved. Our work indicates that volatilization losses during typical arc-spraying may be as follows:

| Element | Weight % Loss |
|---|---|
| Zn | 75 to 95 |
| In | 60 to 75 |
| Sn | up to 20% gain |
| Ga | 15 to 25 |

Volatilization losses do not occur to any significant extent during flame spraying. The compositions of the spray wire or other feed stock for arc-spraying or flame-spraying need to be chosen in the light of these factors, as discussed below.

Alternatively the surface layer may be applied by welding such as arc welding, e.g. by means of a capping pass using spray wire of suitable composition. An advantage of this technique is that the location of the surface layer can be more accurately controlled than when spraying is involved. Other advantages include ease of application of the coating in areas where access is restricted and avoiding the need to prepare the weld surface prior to coating. The surface layer should cover at least part of the surface of the weld bead and should preferably cover the margins of the weld bead and the adjacent surfaces of the welded components; but is does not necessarily have to cover the whole of the weld bead.

Zinc is present in the surface layer in a concentration up to 7%, preferably from 0.1 to 1.5% by weight. The beneficial role of zinc is its contribution to spray wire stiffness after cold drawing which is needed during commercial arc- or flame-spraying. But by itself zinc is not able to generate a sufficiently electronegative potential to prevent weld bead corrosion in neutral, or particularly in acid, environments.

Manganese may be present in the surface layer in a concentration up to 5.0%, particularly from 0.02 to 0.5%. Like Zn, Mn contributes to spray wire stiffness after cold drawing, for which purpose concentrations up to 0.1 suffice. Over Zn, Mn has the great advantage of not being significantly volatilized during arc-spraying, which contributes to a cleaner atmosphere in the arc-spraying room. Mn helps to stabilise alloys containing high concentrations (up to 0.4%) of In, and also helps to counteract the harmful effects of Fe which are discussed below, thus allowing a lower purity Al base to be used. The surface layer may usefully contain both Zn (0.1 to 1.5%) and Mn (0.02 to 0.5%).

With Sn and to a lesser extent Ga, In is the activator element that permits the surface layer to attain the negative potential required for electrochemical protection of the welded structure. A concentration of at least 0.04% is required for this purpose. The upper limit of Indium concentration is subject to some unexpected constraints.

Hot extruded spray wires (2 mm diameter) containing 0.35% by weight In suffer severe intergranular degradation in moist laboratory air. Wire produced using cold drawing during the latter stages of manufacture can reduce or prevent the problem at these concentrations. However, flame-sprayed coatings made from the wire are reduced to powder in laboratory air within a few weeks and arc-sprayed coatings suffer a more localized form of attack. To avoid these problems, the maximum In concentration in the surface layer, in the absence of Mn and Mg is preferably set at 0.16 by weight, a preferred range being 0.04% to 0.10%. Mg has (with Mn) the unexpected effect of protecting surface layers containing higher concentrations of In from corrosion. In the presence of Mg therefore, the In concentration can be up to 0.4% by weight. In addition to its activator properties in making the surface layer more electronegative, In also contributes to spray wire stiffness.

The Sn concentration of the surface layer is preferably 0.05 to 1.1% by weight, particularly 0.12 to 0.50% by weight. Below 0.025%, sprayed coatings with low indium levels can no longer provide electrochemical potentials with sufficient long term stability in acidic saline environments. The In and Sn components are present substantially in solid solution in the Al alloy matrix of the surface layer. By this is meant that precipitate is not detected by methods of examination which can resolve particles down to 100 Angstroms. If Sn (or In) is present as a very fine precipitate or as pre-precipitation clusters, it is regarded herein as being substantially in solid solution. It is believed that the beneficial effects of these two components are not observed to the same extent if they are present in precipitate form.

Sn has very limited solubility in solid Al. The equilibrium solubility limit is about 0.12% by weight at approximately 620° C., decreasing rapidly with decreasing temperatures. Sn concentrations above the solubility limit appear as precipitates when the Al-Sn alloys are conventionally cast and slowly cooled or are equilibreated at temperatures of 190° C. or above. However, when liquid Al-Sn solutions are cooled sufficiently rapidly, the Sn can form a supersaturated solution in the Al matrix which is stable for long periods at ambient temperature. Arc- and flame-spraying are techniques somewhat akin to splat-cooling, and do result in rapid cooling rates, of the order of $10^5$ to $10^6$ °K./s, sufficient of Sn to go into supersaturated solution. This phenomenon has been reported, albeit in a completely different context, in a paper of A. Kirin et al. in Scripta Metallurgica, volume 4, pages 525 to 528, 1970.

Ga is included as another activator element that can help to maintain the surface layer at a more electronegative potential. However a maximum Ga concentration is specified as 0.2% by weight, because above this level self-corrosion becomes significant.

Mg may be present at a concentration from 0.01% up to 6.0% by weight. Mg can help, as noted above, to mitigate oxidation of alloys containing In, and so permit a higher concentration of In to be used.

The balance of the surface layer is Al of at least commercial (99.2%) purity. Better results can be obtained, albeit at added cost, by using high purity (99.9%) Al or super purity (99.98%) Al. The major impurity in Al is Fe, and this has the undesirable property of rendering the surface layer less electronegative than would otherwise be the case. Our electrochemical data suggests that the effect of the aluminium base purity is similar to both acidic and neutral saline environments, viz. +30 and +80 mV respectively for high purity (Fe about 0.08%) and commercial purity (Fe about 0.2%) with respect to super purity (Fe about 0.02%) base. The presence of Fe at concentrations above about 0.04% not only demands higher In/Sn additions to guarantee the potentials required for electrochemical protection, but also increases self-corrosion rates. However, these disadvantages can to some extent be mitigated if the surface layer also contains Mn as noted above.

In another aspect, the invention provides a method of protecting a welded structure in which two Al alloy components are joined together by means of a weld bead, by covering the weld bead by arc-spraying with a surface layer of an Al alloy, characterized in that there is used an arc-spray feed of the composition in weight %:

| | |
|---|---|
| Zn | 0-20 |
| Mn | 0-5.0 |
| In | 0.06-1.6 |
| Sn | 0.00-1.1 preferably 0.03-1.1 |
| Ga | 0-0.26 |
| Mg | 0-10 | balance Al of at least commercial purity.

In another aspect, the invention provides a method of protecting a welded structure in which two Al alloy components are joined together by means of a weld bead, by covering the weld bead by flame-spraying with a surface layer of an Al alloy, characterized in that there is used a flame spray feed of the composition in weight %:

| | |
|---|---|
| Zn | 0-7.0 |
| Mn | 0-5.0 |
| In | 0.02-0.4 |
| Sn | 0.00-1.1 preferably 0.05-1.1 |
| Ga | 0-0.20 |
| Mg | 0-6 | balance Al of at least commercial purity.

In another aspect the invention provides a method of protecting a welded structure in which two Al alloy components are joined together by means of a weld bead, by covering at least part of the weld bead by welding with a surface layer of an Al alloy having the composition in weight %:

| | |
|---|---|
| Zn | 0-7.0 |
| Mn | 0-5.0 |
| In | 0.02-0.4 |
| Sn | 0-1.1 |
| Ga | 0-0.2 |
| Mg | 0-6.0 | balance Al of at least commercial purity.

The use of appropriate arc-spraying or flame-spraying conditions in known manner will result in welded structures in which the weld bead is covered by an Al alloy surface layer of composition as described above. The feed for arc-spraying or flame-spraying is generally wire, typically of diameter in the range 1 to 5 mm. Such wire, not containing Mg or containing up to 3% Mg, is believed novel and forms a further aspect of this invention. Wire for arc-spray coating has the composition in weight %:

| | |
|---|---|
| Zn | 0-20 |
| Mn | 0-5.0 |
| In | 0.06-0.64 |
| Sn | 0.00-1.1 preferably 0.03-1.1 |
| Ga | 0-0.26 |
| Mg | 0-3 | balance Al of at least commercial purity.

Wire for flame spray coating has the composition in weight %:

| | |
|---|---|
| Zn | 0-7.0 |
| Mn | 0-5.0 |
| In | 0.02-0.16 |
| Sn | 0.00-1.1 preferably 0.05-1.1 |
| Ga | 0-0.20 |
| Mg | 0-3 | balance Al of at least commercial purity.

The following Examples illustrate the invention.

EXAMPLE 1

Weld beads were supplied, by arc or spray coating, with surface layers having the compositions given in Table 1. The weldments were tested by slow strain rate testing while immersed in either 3% sodium chloride solution or in a solution containing 2% sodium chloride and 0.5% sodium chromate acidified with hydrochloric acid to pH3. A detailed description of the tensile test method and the production of the welds and coatings is given in the aforementioned ASM paper 8517-046. The elongation at fracture and the position of the crack leading to failure is quoted in Table 2 for conditions of testing at the free corrosion potential and under a superimposed current of +50 microamps/cm$^2$. A low elongation to fracture with cracking tending to be in the toe of the weld was recorded when the welds were left bare or protected by an aluminium alloy coating containing only zinc. Additons of indium, tin and gallium tended to increase the elongation and move the site of fracture away from the plate of the weld.

Weld toe cracking initiates and propagates more readily in acidic than in neutral chloride environments. Ductility tends to be lower in acidic conditions and when the test is carried out with a superimposed anodic current. A number of the coatings provided protection against weld toe or white zone cracking under all of the test conditions. A wider range of coatings provided protection under neutral conditions or where the tests were carried out at the free corrosion potential.

EXAMPLE 2

Weld beads coated as described in Example 1 were immersed in the solutions given in the example and the electrochemical potential measured after one hundred hours at the free corrosion potential. (FCP). A current of +50 microamps/cm$^2$ was then imposed and the potential recorded for 70 hours and the voltage at the end of the test is quoted in Table 3. Coated welds which generated a potential in a window between −1130 and −1200 Mv were also those which during slow tensile testing, fractured away from the weld and gave a high ductility (Table 2). The existence of this window was reported in the aforementioned ASM paper 8517-046. It was concluded that the spray coating on a weld should have a composition chosen to develop and maintain a potential within this window.

It is now realised that under less severe conditions, for example in the neutral chloride solution, weld toe or white zone cracking tends not to occur over a wider range of electrochemical potentials from −1100 to −1300 Mv.

EXAMPLE 3

Sample 15 from Table 1, which had been allowed to stand at room temperature for several months after spraying, was sectioned and the coating examined by SEM using back scattered electrons. This technique is capable of resolving precipitates coarser than 75 Angstroms in diameter. No evidence of precipitation of tin or indium was found.

Transmission electron metallographic analysis was then used to examine the samples for precipitates containing tin, magnesium, indium, or zinc. This technique is capable of resolving and analysing particles coarser than 100 Angstroms but again there was no evidence of any fine precipitates containing these elements other than coarser particles containing zinc or oxygen arising from oxide entrapment during spraying.

It was concluded that the alloying additions in the coating were in solid solution or were present as very fine precipitates less than 75 Angstroms in diameter. Evidence from the splat cooling tests reported in the aforementioned paper by A. Kirin would suggest that the tin is in fact in solution.

TABLE 1

Average Composition of Coating

| Sample | Method | Al | Zn | In | Sn | Ga | Mn | Fe |
|---|---|---|---|---|---|---|---|---|
| 1 | A | CP | .75 | — | — | — | — | 0.23 |
| 2 | F | CP | 4.5 | — | — | — | — | .23 |
| 3 | F | SP | 4.5 | — | — | — | — | .04 |
| 4 | A | SP | 1.1 | — | — | — | — | .04 |
| 5 | A | SP | .06 | .03 | .12 | 0 | — | <.01 |
| 6 | F | SP | 1.09 | .09 | .07 | 0 | — | <.01 |
| 7 | A | SP | .06 | .04 | .12 | .05 | — | <.01 |
| 8 | F | SP | .9 | .06 | .12 | .05 | — | <.01 |
| 9 | A | SP | .04 | .07 | .11 | .09 | — | <.01 |
| 10 | F | SP | 1.18 | .20 | .09 | .11 | — | <.01 |
| 11 | A | HP | — | .022 | 15 | .003 | .08 | .08 |
| 12 | A | CP | — | .026 | .15 | .009 | .07 | .20 |
| 13 | A | HP | — | .026 | .14 | .003 | .23 | .08 |
| 14 | A | CP | — | .024 | .15 | .01 | .23 | .20 |
| *15 | A | SP | .27 | .06 | .12 | — | — | <.01 |
| **16 | F | SP | 3.9 | .28 | .06 | .18 | — | <.01 |
| 17 | A | SP | 71 | .11 | .10 | .18 | — | <.01 |
| 18 | A | SP | .16 | .09 | .12 | — | — | <.01 |
| 19 | F | HP | — | .17 | .12 | — | .08 | .08 |
| 20 | F | SP | 4.5 | .04 | .08 | — | — | <.01 |

F = Flame Sprayed Coatings
A = Arc Sprayed Coatings
* = Alloy used for SEM and Probe Work
** = Powdered In a few days
CP = Commercial purity
HP = High purity
SP = Super purity

TABLE 2

Slow Strain Ratio Tests
% Plastic Elongation (Average)
Environment

| | 0.5% Chromate 2.0% Chloride pH 3 | | 3% Chloride pH 7 |
|---|---|---|---|
| | FCP | | FCP |
| Weld without coating | 5.0T (3.5T) | 10.0P | |
| 1 | 3.5T | — | — |
| 2 | 3.5T | — | — |
| 3 | 6.8T | (6.9P) | — |
| 4 | 8.6P | (5.7T) | — |
| 5 | 9.1P | (7.1T) | — |
| 6 | >8.9P | (9.9P) | — |
| 7 | 10.2P | (8.7P) | — |
| 8 | 8.9P | (9.4P) | — |
| 9 | 10.5P | (9.4P) | — |
| 10 | 8.6P | (9.7P) | — |
| 11 | — | — | — |
| 12 | — | — | — |
| 13 | — | — | — |
| 14 | — | — | — |
| 15 | 11.0P | (7.4P) | 10.1P |
| 16 | — | — | — |
| 17 | 12.0P | (12.0P) | — |
| 18 | 11.6P | (9.1P) | 9.8P |
| 19 | 12.2P | (4.4T) | — |
| 20 | 10P | (8.5T) | — |

( ) 50 μA/cm$^2$
T Failed in toe of weld
P Failed in parent metal

TABLE 3

Electrochemical Potentials
Potential (mV)

| Sample | 0.5% Chromate 2.0% Chloride pH 3 | | 3% Chloride pH 7 | |
|---|---|---|---|---|
| 1 | −921 | (−894) | −1137 | (−955) |
| 2 | −1060 | (−890) | −1154 | (−1120) |
| 3 | −1072 | (−1060) | −1205 | (−1119) |
| 4 | −1131 | (−959) | −1318 | (−1206) |
| 5 | −1128 | (−1042) | −1200 | (−1189) |
| 6 | −1193 | (−1170) | — | — |
| 7 | −1129 | (−1064) | −1276 | (−1277) |
| 8 | −1190 | (−1152) | −1342 | (−1303) |
| 9 | −1171 | (−1128) | −1246 | (−1239) |
| 10 | −1256 | (−1227) | −1324 | (−1297) |
| 11 | −949 | (−930) | −1216 | (−1206) |
| 12 | −1046 | (−959) | −1167 | (−1157) |
| 13 | −944 | (−928) | −1195 | (−1180) |
| 14 | −1000 | (−954) | −1147 | (−1127) |
| 15 | −1162 | (−1122) | −1257 | (−1256) |
| 16 | — | — | — | — |
| 17 | −1184 | (−1157) | −1342 | (−1220) |
| 18 | −1197 | (−1180) | −1266 | (−1245) |
| 19 | −1130 | (−1050) | — | — |
| 20 | −1150 | (−1130) | — | — |

( ) 50 μA/cm$^2$ after 70 hours
— Free Corrosion Potential after 100 hours

EXAMPLE 4

Active welding wire based on super purity aluminium, of composition Al, 5.25% Mg, 0.35% In, 0.2% Sn, was used for flame-spraying under the conditions described in Example 1. Weld beads so coated were tested as described in Example 1 in the acidic saline solution at pH 3. The elongation at break under free corrosion potential was 5.6%, and the failure was in the toe of the weld. The electrochemical potential was −1360 mV which drifted to −1260 mV.

In this experiment, the weld bead was overprotected. By choosing an alloy containing a smaller proportion of In, it would have been possible to achieve effective corrosion protection and an electrochemical potential within the desired −1130 to −1200 mV window.

The experiment also shows the use of Mg to stabilise wire containing a rather high concentration of In, and which would have suffered rapidly from intergranular corrosion in the absence of the Mg.

EXAMPLE 5

A super purity aluminium alloy containing 0.06% In was flame sprayed onto a weld bead as described in Example 1. On being subjected to slow strain rate testing as described in Example 1 at pH3, the elongation at fracture was 6%, and failure was in the toe of the weld. The free corrosion potential was initially −1150 mV, but this drifted to −1000 mV. Addition of a small amount of Sn to the alloy could have prevented the drift and given stable and effective protection.

EXAMPLE 6

The components used in this experiment were of 5083 alloy containing an addition of 1% Zn, and were in the -H321 temper meaning that they were strain hardened during fabrication via both hot and cold deformation. 15 mm thick plate was welded using commercial NG 61 (Al, 5.25% Mg) welding wire. A coating was applied to the weld beads by arc spraying using an Al-1% Zn-0.16% In-0.10% Sn wire based on super purity aluminium that gave an Al, 0.14% Zn, 0.06% In, 0.10% Sn coating. The coated weldments were then heat treated for three days at 150° C. to give a sensitized condition that, in the absence of the spray coating, would have suffered weld toe cracking and exfoliation corrosion in the heat-affected zone.

The welds were subjected to slow strain rate testing under the conditions generally as described in Example 1, but using a 3% NaCl, 0.3% H2O2, a very potent stress corrosion cracking test solution. The strain rate was five times that used in the previous examples for 7000 Series alloys. The results were as follows:

Arc spray coated welds tested in a dry environment showed an elongation at break of 4.0%.

Arc spray coated welds tested in the test solution showed an elongation at break of 4.0%. The free corrosion potential was −1120 mV.

Uncoated welds tested in the test solution showed an elongation at break of 0.9%.

Weld failure in 5083 alloys initiates at the weld toe even in dry conditions. Dry failure propagates through the heat-affected zone directly from the weld-toe.

EXAMPLE 7

This example shows application of the surface coating by welding.

7017 alloy components in the T651 temper were welded using a single pass of commercial NG 61 alloy welding wire. A capping pass involved arc welding using an arc-spray wire of composition Al-1% Zn-0.16% In-0.1% Sn. Two weld profiles were obtained:

a. The surface coating was limited to the weld bead and did not cover either the margins of the weld bead or the adjacent surfaces of the welded components.

b. The surface coating covered not only the weld bead but also the margins and the adjacent surfaces of the components.

The welds were subjected to slow strain rate testing, either in a dry atmosphere or in the acid saline solution as described in Example 1. The following results were obtained:

| Profile | Elongation (%) | E(mV) | Failure Mode |
|---|---|---|---|
| a | 5.6 | −1070 | Toe |
| b | 9.2 | −1110 | Plate (pseudo toe) |
| b | 10.7 | Dry | Plate (pseudo toe) |

Failure for b initiates at the edge of the weld-overlap surface coating. The results for a and b could have been improved by increasing the In concentration to 0.20% and adding sufficient Mg to prevent corrosion of the arc spray wire.

When formulating a wire for spray coating to form the surface layer, a number of factors have to be taken into account, as has been mentioned above. These are:

(a) The In concentration in the surface layer needs to be kept below 0.16% to avoid unacceptable oxidation. Alternatively, if Mg and/or Mn is included in the surface layer, the restraint on In concentration is removed.

(b) The Ga concentration needs to be kept below 0.20 and preferably below 0.05% to avoid the risk of self-corrosion.

(c) The Sn (and also the In) needs to be present substantially in solid solution.

(d) Enough Zn (and/or Mg and/or Mn) may need to be present to provide a spray wire of adequate stiffness. Alternatively, the In may provide adequate stiffness without the need for added Zn or Mg or Mn.

(e) The Al needs to be of sufficient purity. If high purity or commercial purity Al is used instead of super purity then the increased iron content raises the FCP (i.e. makes the surface layer less electronegative) by about 30 and about 80 mV respectively, and the concentrations of In, Sn, and Ga and Zn may need to be increased to compensate for this. Furthermore Fe may interact with Mn, in such a way as to either increase or decrease the potential of the surface coating depending on conditions.

(f) If the surface layer is to be applied by arc-spraying, then the composition of the spray wire needs to be formulated taking into account the volatilization losses of some components, particularly Zn, In, Ga and Mg as noted above.

We claim:

1. A welded structure in which two Al alloy components are joined together by means of a weld bead which is at least partly covered by a surface layer of an Al alloy, wherein the surface layer has the composition in weight %:

| | |
|---|---|
| Zn | 0–7.0 |
| Mn | 0–5.0 |
| In | 0.02–0.4 |
| Ga | 0–0.2 |
| Mg | 0–6.0 | balance Al of at least commercial purity, the In being present substantially in solid solution, with the proviso that, in the absence of added Mg or Mn, the In concentration is not more than 0.16%.

2. A welded structure as claimed in claim 1, in which the surface layer has the composition in weight %:

| | |
|---|---|
| Zn | 0.1–1.5 |
| In | 0.02–0.16 |

-continued

| | |
|---|---|
| Ga | 0–0.2 | balance Al of at least commercial purity.

3. A welded structure as claimed in claim 1, in which the surface layer has the composition in weight %:

| | |
|---|---|
| Mn | 0.02–5.0 |
| In | 0.02–0.16 |
| Ga | 0–0.2 | balance Al of at least commercial purity.

4. A welded structure as claimed in claim 1, in which the surface layer has the composition in weight %:

| | |
|---|---|
| Zn | 0.1–1.5 |
| Mn | 0.02–0.5 |
| In | 0.02–0.16 |
| Ga | 0–0.2 | balance Al of at least commercial purity.

5. A welded structure as claimed in claim 1, wherein the Mg content is from 0.01–6% by weight.

6. A welded structure as claimed in claim 1, wherein the Al is of at least high purity.

7. A welded structure as claimed in claim 1, wherein one or both components are of a 7000 Series alloy.

8. A method of protecting a welded structure in which two Al alloy components are joined together by means of a weld bead, by covering the weld bead by arc spraying with a surface layer of an Al alloy, wherein there is used an arc spray feed of the composition in weight %:

| | |
|---|---|
| Zn | 0–20 |
| Mn | 0–5.0 |
| In | 0.06–0.64 |
| Ga | 0–0.26 |
| Mg | 0–10 | balance Al of at least commercial purity.

9. A method of protecting a welded structure in which two Al alloy components are joined together by means of a weld bead, by covering the weld bead by flame spraying with a surface layer of an Al alloy, wherein there is used a flame spray feed of the composition in weight %:

| | |
|---|---|
| Zn | 0–7.0 |
| Mn | 0–5.0 |
| In | 0.02–0.4 |
| Ga | 0–0.20 |
| Mg | 0–6 | balance Al of at least commercial purity, with the proviso that, in the absence of added Mg or Mn, the In concentration is not more than 0.16%.

10. A method of protecting a welded structure in which two Al alloy components are joined together by means of a weld bead, by covering at least part of the weld bead by welding with a surface layer of an Al alloy having the composition in weight %:

| | |
|---|---|
| Zn | 0–7.0 |
| Mn | 0–5.0 |
| In | 0.02–0.4 |
| Ga | 0–0.2 |
| Mg | 0–6.0 | balance Al of at least commercial purity, with the proviso that, in the absence of added Mg or Mn, the In concentration is not more than 0.16%.

11. Wire for arc-spray coating or welding having the composition in weight %:

| | |
|---|---|
| Zn | 0–20 |
| Mn | 0–5.0 |
| In | more than 0.1–0.64 |
| Sn | 0.05–1.1 |
| Ga | 0–0.26 |
| Mg | 0–3 | balance Al of at least commercial purity.

12. Wire for flame-spray coating having the composition in weight %:

| | |
|---|---|
| Zn | 0–7.0 |
| Mn | 0–5.0 |
| In | more than 0.1–0.16 |
| Sn | 0.05–1.1 |
| Ga | 0–0.20 |
| Mg | 0–3 | balance Al of at least commercial purity.

13. A welded structure in which two Al alloy components are joined together by means of a weld bead which is at least partly covered by a surface layer of an Al alloy, wherein the surface layer has the composition in weight %:

| | |
|---|---|
| Zn | 0–7.0 |
| Mn | 0–5.0 |
| In | 0.02–0.4 |
| Sn | 0.05–1.1 |
| Ga | 0–0.2 |
| Mg | 0–6.0 | balance Al of at least commercial purity, the In and Sn being present substantially in solid solution.

14. A welded structure as claimed in claim 13, wherein the Sn content is from 0.12–0.50% by weight.

15. A welded structure as claimed in claim 13, in which the surface layer has the composition in weight %:

| | |
|---|---|
| Zn | 0.1–1.5 |
| In | 0.02–0.16 |
| Sn | 0.05–1.1 |
| Ga | 0–0.2 | balance Al of at least commercial purity.

16. A welded structure as claimed in claim 13, in which the surface layer has the composition in weight %:

| | |
|---|---|
| Mn | 0.02–5.0 |
| In | 0.02–0.16 |
| Sn | 0.05–1.1 |
| Ga | 0–0.2 | balance Al of at least commercial purity.

17. A welded structure as claimed in claim 13, in which the surface layer has the composition in weight %:

|    |           |
|----|-----------|
| Zn | 0.1–1.5   |
| Mn | 0.02–0.5  |
| In | 0.02–0.16 |
| Sn | 0.05–1.1  |
| Ga | 0–0.2     | balance Al of at least commercial purity.

18. A welded structure as claimed in claim 13, wherein the Mg content is from 0.01–6% by weight.

19. A welded structure as claimed in claim 13, wherein the Al is of at least high purity.

20. A welded structure as claimed in claim 13, wherein one or both components are of a 7000 Series alloy.

21. A method of protecting a welded structure in which two Al alloy components are joined together by means of a weld bead, by covering the weld bead by arc spraying with a surface layer of an Al alloy, wherein therein there is used an arc spray feed of the composition in weight %:

|    |          |
|----|----------|
| Zn | 0–20     |
| Mn | 0–5.0    |
| In | 0.06–1.6 |
| Sn | 0.05–1.1 |
| Ga | 0–0.26   |
| Mg | 0–10     | balance Al of at least commercial purity.

22. A method of protecting a welded structure in which two Al alloy components are joined together by means of a weld bead, by covering the weld bead by flame spraying with a surface layer of an Al alloy, wherein there is used a flame spray feed of the composition in weight %:

|    |           |
|----|-----------|
| Zn | 0–7.0     |
| Mn | 0–5.0     |
| In | 0.02–0.4  |
| Sn | 0.05–1.1  |
| Ga | 0–0.2     |
| Mg | 0–6.0     | balance Al of at least commercial purity.

23. A method of protecting a welded structure in which two Al alloy components are joined together by means of a weld bead, by covering at least part of the weld bead by welding with a surface layer of an Al alloy having the composition in weight %:

|    |           |
|----|-----------|
| Zn | 0–7.0     |
| Mn | 0–5.0     |
| In | 0.02–0.4  |
| Sn | 0.05–1.1  |
| Ga | 0–0.2     |
| Mg | 0–6.0     | balance Al of at least commercial purity.

* * * * *